(12) United States Patent
Nyman et al.

(10) Patent No.: US 8,080,150 B2
(45) Date of Patent: Dec. 20, 2011

(54) ELECTROLYTIC CELL

(75) Inventors: Lars Nyman, Fransta (SE); Fredrik Herlitz, Sundsvall (SE); Jonas Echardt, Halmstad (SE); Takayuki Shimamune, Machida (JP); Helga Hakansson, Sundsvall (SE)

(73) Assignee: RWO GmbH, Bremen (DE)

( * ) Notice: Subject to any disclaimer, the term of this patent is extended or adjusted under 35 U.S.C. 154(b) by 896 days.

(21) Appl. No.: 11/014,203

(22) Filed: Dec. 17, 2004

(65) Prior Publication Data

US 2005/0224369 A1    Oct. 13, 2005

Related U.S. Application Data

(60) Provisional application No. 60/530,262, filed on Dec. 18, 2003.

(51) Int. Cl.
*C02F 1/46* (2006.01)
(52) U.S. Cl. ..... 205/701; 205/742; 205/758; 204/275.1; 204/284
(58) Field of Classification Search .......... 205/701, 205/742, 758; 204/275.1, 284
See application file for complete search history.

(56) References Cited

U.S. PATENT DOCUMENTS

| | | | |
|---|---|---|---|
| 3,933,606 A | 1/1976 | Harms | |
| 5,419,824 A | 5/1995 | Weres et al. | |
| 5,770,037 A * | 6/1998 | Goto et al. | 205/701 |
| 6,328,875 B1 | 12/2001 | Zappi et al. | |
| 6,709,567 B1 * | 3/2004 | Sale et al. | 205/688 |
| 6,814,840 B2 * | 11/2004 | Henuset et al. | 204/242 |
| 2002/0158018 A1 | 10/2002 | Abramowitz et al. | |
| 2002/0185382 A1 | 12/2002 | Fauvarque et al. | |
| 2003/0226766 A1 | 12/2003 | Orlebeke | |

FOREIGN PATENT DOCUMENTS

| | | |
|---|---|---|
| EP | 1340841 A1 | 9/2003 |
| WO | WO 02/26635 | 4/2002 |
| WO | WO 03/003556 | 5/2003 |

OTHER PUBLICATIONS

Zhong Li et al, "Degradation of Organic Pollutants by the Advanced Oxidation Processes", Chinese J. of Chem, Eng., 7(2) 110-115 (1999).
International Search Report of PCT/SE2004/001871, completed Apr. 22, 2005.
European Search Report of EP 03445146, completed May 13, 2004.

* cited by examiner

*Primary Examiner* — Arun S Phasge
(74) *Attorney, Agent, or Firm* — David J. Serbin; WRB-IP LLC

(57) ABSTRACT

The present invention relates to a process of treating contaminated water containing microorganisms comprising feeding a contaminated water stream at a volumetric flow of about 1 to about 1000 $m^3/h$ through an electrolyser zone, said water stream having a conductivity from about 0.0001 to about 100 S/m, electrolysing said water stream in said electrolyser zone defined by at least one electrode pair enabling treatment of microorganisms, said at least one electrode pair comprising an anode and a cathode without separator means, said water stream being guided substantially perpendicularly through said at least one anode and cathode while imposing a voltage across said anode and cathode and supplying a direct current to said anode and cathode, withdrawing from the electrolyser zone a treated water stream. The invention also relates to an electrolytic cell in which said process can be performed, and to the use of the electrolytic cell.

29 Claims, 1 Drawing Sheet

ELECTROLYTIC CELL

This application claims domestic priority from provisional application No. 60/530,262 filed Dec. 18, 2003.

The present invention relates to a process of treating contaminated water comprising microorganisms, an electrolytic cell in which the process is carried out, and the use of the cell for treatment of contaminated waters derived from various applications and sources.

BACKGROUND OF THE INVENTION

Treatment of waste water containing microorganisms has been performed for a fairly long period of time. However, treatment processes based on electrolysis have hitherto not been completely problem-free. Inefficient processes as well as expensive equipment or high energy consumption have previously prevented improved handling of microorganisms occurring in e.g. waste water, cooling water, ballast water, and recirculated washing water. U.S. Pat. No. 5,419,824 discloses an electrolytic cell for destroying contaminants. However, this process is very expensive and inefficient for applications where large volumes of water are treated due to extensive pressure drop, low flow rates, and low current efficiency.

In WO 02/26635, it has been further tried out embodiments for reducing contaminants and microorganisms in which alternating current is supplied to a cell. This has, however, not always been seen to be a successful way of performing the chemical reactions in the cell.

It has been further seen in the prior art that cleaning systems involving reduction of contaminants often have been provided with a reactor tank arranged to the pipings through which the medium to be cleaned passes. This configuration, however, often results in pressure drops and lower throughput of the medium to be cleaned. The retention time may also be prolonged which is not always satisfying, particularly if large volumes of contaminated water needs rapid treatment.

The present invention intends to provide an efficient process and a cell solving the problems of the prior art. A further object of the present invention is to provide an improved control of the hydrogen and chlorine formation in the electrolytic cell.

THE INVENTION

The present invention relates to an electrolytic cell comprising at least one electrode pair defining an electrolyser zone, said electrode pair comprising an anode and cathode, arranged substantially parallelly without separator means in between, allowing for a high throughput of electrolyte across said anode and cathode, wherein said anode and cathode enable treatment of microorganisms in a water stream having a conductivity from about 0.0001 to about 100 S/m passing said electrode pair, said electrolytic cell further comprising means for imposing a voltage across said anode and cathode and means for supplying a direct current to said cell. The following anode and cathode reactions would be likely to occur within an electrode pair:

Anode Reactions
a) $2Cl^- = Cl_2 + 2e^-$
b) $H_2O = 1/2 O_2 + 2H^+ + 2e^-$
c) $2H_2O = H_2O_2 + 2H^+ + 2e^-$
d) $3H_2O = O_3 + 6H^+ + 6e^-$
e) Oxidation of Organic materials Cathode reactions
a) $2H^+ + 2e^- = H_2$
b) $2H_2O + 2e^- = H_2 + 2OH^-$
c) $H_2O + O_2 + 2e^- = HO_2^- + OH^-$
d) $Cl_2 + 2e^- = 2Cl^-$
e) Reduction of organic materials Possible chemical reactions occurring between anode and cathode products formed from inter alia the above listed reaction formulae in between the anodes and cathodes of the electrode pairs include inter alia
a) $Cl_2 + 2OH^- = ClO^- + Cl^- + H_2O$
b) $Cl_2 + HO_2^- = HCl + Cl^- + O_2$
c) $3ClO^- = ClO_3^- + 2Cl^-$
d) $H^+ + HO_2^- = H_2O_2$
e) Other reactions, e.g. formation of hydroxyl radicals as further described in "Degradation of Organic Pollutants by the Advanced Oxidation Processes", Chinese J. of Chem.Eng, 7(2) 110-115 (1999).

By the term "cross section area" is meant the area of the cell through which the electrolyte flows as it passes from the inlet to the outlet of the cell. The cross section area of the cell may vary along the flow path, but preferably, this area is constant. At the location of said at least one electrode pair, the anode and the cathode constitute a partly open area through which electrolyte can pass. The open cross section area is defined herein in as the area not blocked by the electrodes in percent of the total cross section area the cell has at said location.

By the term "electrode pair" is meant an anode and a cathode arranged together with a relatively small distance from each other, preferably a distance that is smaller than the distance to any other possible electrode pair or single electrode in the cell. Preferably, the distance between the anode and the cathode in an electrode pair is from about 0.2 to about 10, preferably from about 0.2 to about 5, and most preferably from about 0.2 to about 3 mm. Preferably, the distance between adjacent electrode pairs is from about 3 to about 25, most preferably from about 5 to about 15 times the distance between the anode and the cathode in each electrode pair, i.e. from about 0.6 to about 250, most preferably from about 1 to about 150 mm.

In the elaboration of the above cell, it was found that separator means in an electrode pair was detrimental to the functioning of the whole cell, inter alia due to the fact that it may result in a considerable pressure drop since the throughput of the treated medium then is reduced, but also due to the fact that such a separator means may inhibit the desired reactions between the reactions products at the anode and the cathode to occur.

The means of supplying a direct current may be e.g. a conventional rectifier. It has been found that, in order to safeguard that the desired reactions occur within each electrode pair, the anode preferably is followed by a cathode on which the reaction products formed on the anode may react further such that the amount of microorganisms can successfully be kept at a minimal level. This process may not always be effected successfully in the case of alternating currents being supplied to the cell, since such a current changes the poles of the electrodes and the necessary reactions would not occur in time. If the reaction products on the anode are not reacted further to form hydroxyl radicals, the reaction products may otherwise decompose such that no selected formation of hydroxyl radicals occurs. This is of course detrimental to the process since the hydroxyl radicals are essential for the treatment of the microorganisms.

Preferably, the electrode pair is thus arranged such that a water stream entering the cell first encounters the anode and then the cathode such that products from the anode reactions can react at the cathode or rapidly mix with products from the cathode reactions to further increase the efficiency of the process and also reduce the formation of trihalomethanes (THM) or other toxic chlorinated organics in chloride containing water. This is particularly advantageous in the configuration of the electrode pair without any intermediate separator between anode and cathode. The reaction products from the anode reactions may thus be instantly mixed with the reaction products of the cathode which may react further at the cathode. Toxic reaction products of $Cl_2$ when electrolyzed in chloride-containing water systems may accordingly be further transformed to less toxic or non-toxic ClO or OH radicals or the like, and other reaction products may also be transformed to non-toxic compounds which may function as effective disinfectants which may reduce COD and BOD further such that substantially no formation of THM occurs from reaction between formed $Cl_2$ and organic compounds. The possible subsequent electrode pairs are preferably arranged in the same way as the first one. However, other arrangement may also be possible, e.g. wherein a cathode is arranged before an anode in the flow direction of the electrolyte.

According to one preferred embodiment, the electrode pair or pairs constituting the reaction zone or the cell is integrated in the piping system through which the water to be purified passes. The cell may then have the same diameter as the piping through which the contaminated water is supplied. This results in a simpler and a more cost effective system that easily can be arranged and transported to the site where the purification is effected.

The term "substantially in parallel" in the context of the arrangement of the relative position of the anode and the cathode means that the electrodes may, even though this is not preferred, be angled to a certain extent from each other. The angle between the anode and the cathode in the electrode pair is thus not necessarily 0° as would be the case if they were arranged in parallel. Preferably, the angle between the anode and the cathode is from about 0 to about 45°, more preferably from about 0 to about 30°, and most preferably from about 0 to about 10°.

The electrodes, i.e. the anode and the cathode, suitably comprise an electrode substrate with apertures such as a mesh, e.g. an expanded metal mesh; a wire cloth, perforated plates or sheet metals, sintered metal fibres, sintered metal powder, or any other perforated configuration. The apertures may have any suitable shape, but preferably the apertures have the shape of a rhomb, square, rectangle, trapezium, circle or the like. The dimensions (e.g. the sides of a rhomb) of the apertures suitably range from about 0.5 to about 50, preferably from about 0.5 to about 15 mm. Each aperture preferably has an area from about 0.01 to about 2500, more preferably from about 0.2 to about 500, and most preferably from about 1 to about 100 $mm^2$. This cell configuration will provide for low pressure drop as the electrolyte flows through the cell.

Preferably, the cathode substrate is fabricated of nickel, titanium, or other suitable metal, or a conductive nonmetallic material; graphite fibres, graphitised cloth, or a conductive metal oxide.

Preferably, the anode substrate is fabricated of titanium, niobium or other suitable metal, or a conductive nonmetallic material; e.g. p-doped silicon.

Preferred anode coatings include boron doped diamond (BDD), $PbO_2$ and $SnO_2$. Other suitable anode coatings are platinised titanium, platinum, activated carbon, graphite, as well as the coating materials mentioned in European patent application no.03445079.1.

Preferred cathode coatings include boron doped diamond (BDD), activated carbon, graphite, as well as the coating materials mentioned in European patent application no.03445079.1.

Preferably, the open cross section area of said at least one anode and cathode is from about 20 to about 75, and most preferably from about 25 to about 60% of the total cross section area. As the open cross section area increases, the pressure drop is reduced in the cell since the electrolyte can flow through the cell more easily.

Preferably, the thickness of the respective electrodes is from about 0.2 to about 3, more preferably from about 0.2 to about 2, and most preferably from about 0.2 to about 1.5 mm.

Preferably, the electrodes are monopolar such that the current load and the cell voltage of each electrode pair can be adjusted individually. However, bipolar electrodes may in some arrangements be employed.

Preferably, the specific surface area of the anode and the cathode is from about 1 to about 1000, most preferably from about 10 to about 1000 $m^2/m^2$ projected surface area.

The cathode suitably has a high hydrogen formation overvoltage, preferably higher than about 300, and most preferably higher than about 500 mV. Preferably, the anode has a high oxygen formation overvoltage, preferably higher than about 400 mV, and most preferably higher than about 700 mV.

The electrodes may be scratched, embossed, patterned or otherwise roughened to increase the local turbulence near the electrode pairs.

The number of electrode pairs will depend on the flow rate and the concentration of microorganisms to be treated. However, the cell preferably comprises from about 1 to about 10, more preferably from about 1 to about 7, and most preferably from about 2 to about 5 electrode pairs.

The electrode pair(s) is preferably mounted in a suitable housing or assembly which supports the electrodes.

Preferably, the cross section area of the cell is from about 0.00003 to about 5, preferably from about 0.0001 to about 2, and most preferably from about 0.001 to about 1 $m^2$. The inlet and outlet suitably have the same dimensions and cross section areas as the electrolytic cell to minimise the pressure drop. However, other inlet and outlet areas are also possible, e.g. a larger cross section area at the inlet than the cell cross section area to render the water stream more turbulent.

The invention also relates to a process of treating contaminated water containing microorganisms comprising feeding a contaminated water stream at a volumetric flow of about 1 to about 1000 $m^3/h$ through an electrolyser zone, said water stream having a conductivity from about 0.0001 to about 100 S/m, electrolysing said water stream in said electrolyser zone defined by at least one electrode pair enabling treatment of microorganisms, said at least one electrode pair comprising an anode and a cathode without separator means, said water stream being guided substantially perpendicularly through said at least one anode and cathode while imposing a voltage across said anode and cathode and supplying a direct current to said anode and cathode, withdrawing from the electrolyser zone a treated water stream.

The term "substantially perpendicularly" as used herein with regard to the flow direction through the electrode pair means that the water stream may flow perpendicularly towards the plane of the anode and cathode constituting the electrode pair, i.e. at a right angle or 90° to said plane but also at a deviated angle up to about 60° from said "right angle" flow.

Preferably, the volumetric flow of the water stream is from about 1 to about 750, more preferably from about 5 to about 500, and most preferably from about 10 to about 500 $m^3/h$.

The linear flow rate suitably is from about 0.1 to about 10, preferably from about 0.2 to about 8, and most preferably from about 0.2 to about 5 m/s. It has been found that the volumetric flow and its corresponding linear flow rate in the range of the present invention provides for an increased current efficiency, whereby less current is needed for treating the microorganisms.

Preferably, the linear flow rate of the water stream entering the cell is so high that turbulence is easily achieved when reaching the first electrode. An increased turbulence results in increased mass transfer which in turn yields a more efficient treatment of the microorganisms. Preferably, the Reynold's number in the cell is higher than about 2000, and most preferably higher than about 5000. However, Reynold's number is preferably lower than about 100000.

Turbulence and thereby also mass transfer may be increased by increasing the flow of water.

The electrolysis taking place in the cell results in production of hydroxyl radicals and hydrogen peroxide which can kill microorganisms in order to prevent biofouling and other unwanted effects of microorganisms. The cell can also be useful in reducing COD in contaminated waters.

The hydroxyl radicals can be generated directly on the anode surface by oxidation of water on a suitable anode as defined herein. The hydroxyl radicals and other types of radicals may also be formed due to decomposition of oxidised or oxygen rich compounds formed at the anode surface, e.g. ozone, hydrogen peroxide, and oxygen, or by reduction of these compounds at the surface of the cathode. Hydroxyl radicals may also be formed by reaction of said oxidised or oxygen rich compounds in the electrolyte. Hydrogen peroxide can also be produced at the cathode and add a long term effect to the water treatment.

The concentration of hydroxyl free radicals decreases rapidly with the distance from the surface of the anode, because the hydroxyl free radicals react readily. Therefore, the reaction of microorganisms dissolved in the water with hydroxyl free radicals produced at the surface of the electrodes take place very close to the surface thereof. Increased surface area of the anode and turbulent water flow at the surface of the anode increase the rate of mass transfer.

Occasionally, it may be advantageous or even necessary to adjust the pH and/or the electrical conductivity of the water to be treated.

The term "microorganism" includes any organism of microscopic size, such as a plankton, bacterium, protozoan, or virus.

According to a preferred embodiment, the cell can occasionally be operated at a constant or at a pulsed current load to further improve the treatment of microorganisms. The pulsed load can be of any suitable kind, e.g. triangular, sinusoidal or stepwise, and have a variation in time. Preferably, the average current density is from about 10 to about 5000, more preferably from about 10 to about 1000, and most preferably from about 25 to about 750 A/m$^2$.

According to another preferred embodiment, the cell can be operated with reversed load to remove scaling deposits. The reversed load can be of the same magnitude as the normal load described herein and the time and frequency of the reversed load can vary.

These measures allow for continuous operation of the cell. The cell may be operated by passing the flow either in single pass through the cell or by recirculating a part of the flow or the entire flow. Even though single pass operation is preferred, it may be needed to recirculate the flow through the cell if the microorganism concentration is still high or the number of electrode pairs is not sufficient for only single pass operation. However, the process may also be performed as a semicontinuous or batchwise process.

It has further been found that this process can be operated in such a way that substantially no chlorine is formed. A measuring and control system, as e.g. the DULCOMETER® instrumentation available from Prominent Dosiertechnik GmbH, is suitably connected to the cell in order to monitor the operation thereof, including the pH and residual chlorine concentration.

The invention also relates to the use of the electrochemical cell as disclosed herein for treatment of contaminated water containing microorganisms, particularly ballast water, waste water, cooling water, and recirculated washing water. The cell can preferably also be used to treat contaminated water in swimming pools. If very large volumes of contaminated water need to be treated, e.g. cooling water or ballast water where the volumetric flow may exceed 10000 or even 100000 m$^3$/h, several electrolytic cells as described herein may of course be arranged in parallel to handle such large flows.

The total number of microorganisms will of course vary depending on the source from which the water is taken. However, the number of microorganisms (bacteria) in sea water may be from about 100 to about 1000000 /cm$^3$.

DESCRIPTION OF THE EMBODIMENT

Figure 1:
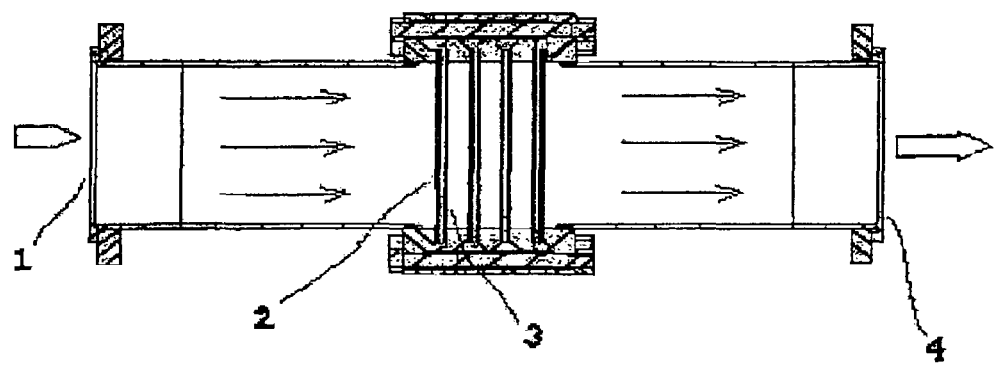
FIG. 1 shows one cell arrangement of the invention.

FIG. 1 shows an electrolytic cell suitable for treating contaminated water comprising microorganisms. The cell comprises an inlet at point 1 through which a water stream comprising microorganisms passes in the direction of the arrows. The entering flow may be pumped to the cell or be pressurised by other means to make it enter the cell. An analogue and a digital flow meter may be provided (not shown) before the cell inlet. The stream passes electrode pairs, each of which comprises an anode 2 and a cathode 3. The electrodes are made up of a mesh structure. As can be seen, four such electrode pairs arranged in parallel are shown in the cell all of which are arranged perpendicularly to the flow direction. The electrode pairs are also arranged over the whole cross section area of the cell. The stream passes through the electrode pairs and exits the cell at an outlet at point 4. The stream leaving the cell may be recirculated to the inlet at point 1 if it is not considered sufficiently decontaminated.

It will be obvious that the invention may be varied in many ways. Such variations are not to be regarded as a departure from the gist and scope of the present invention, and all such modifications as would be obvious to one skilled in the art are intended to be included within the scope of the claims. The following examples will further illustrate how the described invention may be performed without limiting the scope of it.

Example 1

Surface sea water containing plankton, coliform, and heterotrophic bacteria having a conductivity of 5 S/m was pumped into a tank of 800 liters and at the same time filtered through a cotton cloth and a 20 μm filter. Reference organisms of Tetraselmis and Isochrysis (both flagellates) were added together with a non-patogenic colony of the coliform *E-choli* bacteria. Control samples were taken.

Both the anodes and cathodes used were expanded niobium plates coated with conductive boron-doped diamond (BDD). The electrochemical cell comprised six of these BDD electrodes arranged for crossflow passage of the natural sea water in a titanium tube having an inner diameter of 70 mm. The anodes and cathodes were arranged in pairs with a small space of 4 mm between anode and cathode of the same pair and a distance of 41 mm between adjacent pairs.

The water treated in the electrochemical cell was fed through the cell at a flowrate of 10 m$^3$/h (175 l/min) and a current density of 670 A/m$^2$ was applied. The current was 11 A and the power was 126 W. This treatment resulted in a 100% killing of both kinds of plankton reference organisms, 100% reduction of CFU (Colony Forming Units) for coliform bacteria (natural+added *E-choli*) and a 99.96% reduction of CFU for natural occurring heterotrophic bacteria. The plankton analysis was made by light microscopy and bacteria were cultivated with certified standard methods at a laboratory. No THM formation occurred.

Example 2

Natural surface sea water (from the west coast of Sweden) was prefiltered using a net and pumped into a tank of 800 liters. Control samples were taken.

The electrodes and the cell were the same as in example 1. The water was run at the same flow rate and current density, current and power were as in example 1. The treatment resulted in 84% killing of natural occurring zoo planktons and a 93% killing of naturally occurring phytoplanktons. Analysis was made by light microscopy. No THM formation occurred.

Example 3 (Reference)

An electrolytic cell as used in Example 1 but with a porous separator in between the anode and the cathode was prepared. 0.5 mm thick woven mesh with 30% opening made of polypropylene was used as the separator. The water to be treated was flown from the cathode to anode. The electrolysis examination was performed under same conditions as in example 1 but the flow rate could not attain a flow rate of 10 m$^3$/h but was only up to 3 m$^3$/h. Same electric current as example 1 was used. Several ppm of THM (tri-halo-methane) was shown to be formed in the sea water.

The invention claimed is:

1. Process of treating contaminated water containing microorganisms comprising feeding a contaminated water stream at a volumetric flow of 1 to 1000 m$^3$/h through an electrolyser zone, said water stream having a conductivity from 0.0001 to 100 S/m, electrolysing said water stream in said electrolyser zone defined by at least one electrode pair enabling treatment of microorganisms, said at least one electrode pair comprising an anode and a cathode without separator means, wherein the anode coatings include boron doped diamond, said anode and cathode having the shape of a mesh to provide a low pressure drop as the electrolyte flows through the cell, said water stream being guided substantially perpendicularly at a right angle of 90° or at a deviated angle up to 60° from said right angle flow through said at least one anode and cathode while imposing a voltage across said anode and cathode and supplying a direct current to said anode and cathode, wherein the electrolysis results in the production of hydroxyl radicals and hydrogen peroxide which can kill microorganisms in order to prevent biofouling, producing hydroxyl radicals, ozone and hydrogen peroxide on the anode surface by oxidation of water or decomposition of oxidized or oxygen rich compounds and withdrawing from the electrolyser zone a treated water stream, wherein the flow of the water stream is turbulent and wherein the anode has an oxygen formation overvoltage higher than 700 mV and wherein the electrode pair is arranged such that a water stream entering the cell first encounters the anode and thereafter the cathode such that products from the anode reactions can react at the anode or rapidly mix with products from the cathode reactions, to further increase the efficiency of the process.

2. Process according to claim 1, wherein the volumetric flow is from 1 to 750 m$^3$/h.

3. Process according to claim 1, wherein the volumetric flow is from 5 to 500 m$^3$/h.

4. Process according to claim 1, wherein the volumetric flow is from 10 to 500 m$^3$/h.

5. Process according to claim 1, wherein the Reynolds number in the cell is higher than 2000.

6. Process according to claim 1, wherein the Reynolds number in the cell is higher than 5000.

7. Process according to claim 1, wherein the Reynolds number in the cell is lower than 100000.

8. Process according to claim 1, wherein the average current density is from 10 to 5000 A/m$^2$.

9. Process according to claim 1, wherein the average current density is from 10 to 1000 A/m$^2$.

10. Process according to claim 1, wherein the average current density is from 25 to 750 A/m$^2$.

11. Process according to claim 1, wherein the cathode has a hydrogen formation overvoltage higher than 300 mV.

12. Process according to claim 1, wherein scaling deposits are removed by operation with reversed load.

13. Electrolytic cell comprising an inlet through which a water stream passes, comprising at least one electrode pair defining an electrolyser zone, said electrode pair comprising an anode and cathode, arranged substantially parallelly without separator means in between, where the angle between the anode and the cathode is from 0° to 45°, allowing for a high throughput of electrolyte across said anode and cathode, arranged such that said entering water stream flows substantially perpendicularly at a right angle of 90° or at a deviated angle up to 60° from said right angle flow through the electrode pair to enable treatment of microorganisms present in a water stream having a conductivity from 0.0001 to 100 S/m passing said electrode pair, said anode and cathode have the shape of a mesh, wherein the anode coatings include boron doped diamond, said at least one electrode pair being arranged over the whole cross section area of the cell, wherein the cross sectional area of the cell is constant along the flow path, wherein the at least one electrode pair is mounted in a housing, wherein the distance between anode and cathode is smaller than the distance to any other electrode pair in the cell, said electrolytic cell further capable of imposing a voltage across said anode and cathode and of supplying a direct current to said cell, said cell further comprising an outlet, and wherein the electrode pair is arranged such that a water stream entering the cell first encounters the anode and thereafter the cathode such that products from the anode reactions can react at the anode or rapidly mix with products from the cathode reactions, and wherein the inlet and the outlet have the same dimensions and cross sectional areas as the electrolytic cell thereby minimizing a pressure drop.

14. Cell according to claim 13, wherein the angle between the anode and the cathode is from 0° to 30°.

15. Cell according to claim 13, wherein the angle between the anode and the cathode is from 0° to 10°.

16. Cell according to claim 13, wherein the open cross section area of the anode and the cathode is from 20 to 75% of the total cross section area.

17. Cell according to claim 13, wherein the open cross section area of the anode and the cathode is from 25 to 60% of the total cross section area.

18. Cell according to claim 13, wherein the anode and cathode comprise apertures having an area from 0.01 to 2500 mm$^2$.

19. Cell according to claim 13, wherein the cell comprises monopolar electrodes.

20. Cell according to claim 13, wherein the distance between the anode and the cathode in the electrode pair is from 0.2 to 10 mm.

21. Cell according to claim 13, wherein the distance between the anode and the cathode in the electrode pair is from 0.2 to 5 mm.

22. Cell according to claim 13, wherein the distance between the anode and the cathode in the electrode pair is from 0.2 to 3 mm.

23. Cell according to claim 13, wherein the distance between two adjacent electrode pairs is from 3 to 25 times the distance between the anode and the cathode in each electrode pair.

24. Cell according to claim 13, wherein the distance between two adjacent electrode pairs is from 5 to 15 times the distance between the anode and the cathode in each electrode pair.

25. Cell according to claim 13, wherein the distance between two adjacent electrode pairs is from 0.6 to 250 mm.

26. Cell according to claim 13, wherein the distance between two adjacent electrode pairs is from 1 to 150 mm 27. Cell according to claim 13, wherein said cell comprises up to 10 number of electrode pairs.

28. Cell according to claim 13, wherein said cell comprises up to 7 number of electrode pairs.

29. Cell according to claim 13, wherein said cell comprises 2 to 5 number of electrode pairs.

* * * * *